US012724707B2

(12) United States Patent
Chen

(10) Patent No.: US 12,724,707 B2
(45) Date of Patent: Sep. 1, 2026

(54) METHOD AND SYSTEM FOR REDUCING DELAY OF APPLICATION OF MOBILE DEVICE

(71) Applicant: SAMSUNG ELECTRONICS CO., LTD., Suwon-si (KR)

(72) Inventor: Wenwen Chen, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/970,274

(22) Filed: Dec. 5, 2024

(65) Prior Publication Data

US 2026/0072830 A1 Mar. 12, 2026

(30) Foreign Application Priority Data

Sep. 6, 2024 (CN) ......................... 202411252075.9

(51) Int. Cl.
*G06F 12/02* (2006.01)

(52) U.S. Cl.
CPC .... *G06F 12/0253* (2013.01); *G06F 2212/702* (2013.01)

(58) Field of Classification Search
CPC ........... G06F 12/0253; G06F 2212/702; G06F 2212/7205; G06F 16/1847; G06F 16/17; G06F 3/0611; G06F 3/0659; G06F 3/0679
See application file for complete search history.

(56) References Cited

U.S. PATENT DOCUMENTS

| | | | | |
|---|---|---|---|---|
| 9,307,493 | B2 | 4/2016 | Backholm et al. | |
| 10,534,705 | B2 * | 1/2020 | Lee | G06F 9/5016 |
| 11,438,790 | B2 | 9/2022 | Gu et al. | |
| 11,693,693 | B2 | 7/2023 | Chen et al. | |
| 12,271,629 | B2 * | 4/2025 | Jeon | G06F 12/0253 |
| 2015/0127863 | A1 * | 5/2015 | Sokol, Jr. | G06F 13/37 710/111 |
| 2019/0073297 | A1 * | 3/2019 | Goss | G06F 3/0616 |
| 2019/0179747 | A1 * | 6/2019 | Kim | G06F 3/0679 |
| 2020/0334166 | A1 * | 10/2020 | Byun | G06F 12/10 |
| 2020/0349069 | A1 * | 11/2020 | Yu | G06F 3/0652 |
| 2022/0350450 | A1 | 11/2022 | Li et al. | |
| 2023/0057577 | A1 * | 2/2023 | De La Cerda | G06F 3/0604 |
| 2023/0164630 | A1 | 5/2023 | Lin et al. | |
| 2024/0118809 | A1 * | 4/2024 | Seok | G06F 3/0679 |
| 2024/0256443 | A1 * | 8/2024 | Amritkar | G06F 12/0246 |
| 2024/0419326 | A1 * | 12/2024 | Choudhary | G06F 3/064 |

* cited by examiner

*Primary Examiner* — Huawen A Peng
(74) *Attorney, Agent, or Firm* — Sughrue Mion, PLLC

(57) ABSTRACT

A method for reducing delay of an application of a mobile device, includes: detecting at least one foreground application and obtaining input/output (I/O) throughput of the at least one foreground application; determining a status of the mobile device, based on the I/O throughput of the at least one foreground application; and determining a mode of dispatching discard commands to a storage device of the mobile device, based on the determined status of the mobile device.

20 Claims, 11 Drawing Sheets

METHOD AND SYSTEM FOR REDUCING DELAY OF APPLICATION OF MOBILE DEVICE

CROSS-REFERENCE TO RELATED APPLICATION

This application claims priority to Chinese Patent Application No. 202411252075.9, filed on Sep. 6, 2024, in the National Intellectual Property Administration of P.R. China, the disclosure of which is incorporated by reference herein its entirety.

BACKGROUND

1. Field

The disclosures relate to the field of storage, and more particularly, to a method and a system for reducing response time of a mobile device.

2. Description of Related Art

The response time of an application of mobile device is an important factor to judge its performance. If the response time of the application is too long or a stuck occurs, the user experience of the mobile device may be seriously affected.

In addition, 'Application Not Response' (ANR) is also an important performance index of the mobile device. ANR means that the application cannot respond to the user's input or operation for a period of time.

Therefore, a method or a system for reducing the response time of the application of mobile device and the occurrence of ANR issue is very important for improving the performance of mobile device and user experience.

SUMMARY

This summary is provided to introduce a selection of concepts in a simplified form that are further described below in the Detailed Description. This summary is not intended to identify key features and/or essential features of the claimed subject matter, nor is it intended to be used as an aid in determining the scope of the claimed subject matter.

According to an aspect of the disclosure, a method for reducing delay of an application of a mobile device, includes: detecting at least one foreground application and obtaining input/output (I/O) throughput of the at least one foreground application; determining a status of the mobile device, based on the I/O throughput of the at least one foreground application; and determining a mode of dispatching discard commands to a storage device of the mobile device, based on the determined status of the mobile device.

According to an aspect of the disclosure, a system for reducing delay of an application of a mobile device, includes: a detector configured to detect at least one foreground application and to obtain a process list of the at least one foreground application; a status monitor configured to obtain input/output (I/O) throughput of the at least one foreground application based on the process list of the at least one foreground application, and determine a status of the mobile device based on the I/O throughput of the at least one foreground application; and a discard command manager configured to determine a mode of dispatching discard commands to a storage device of the mobile device, based on the determined status of the mobile device.

According to an aspect of the disclosure, an electronic device includes: a storage device; and a processor configured to perform: detect at least one foreground applications and obtain input/output (I/O) throughput of the at least one foreground application; determine a status of the electronic device, based on the I/O throughput of the at least one foreground application; and determine a mode of dispatching discard commands to the storage device, based on the determined status of the electronic device.

Other aspects and/or advantages of inventive concepts will be partially described in the following description, and part will be clear through the description and/or may be learn through the practice of various example embodiments.

BRIEF DESCRIPTION OF DRAWINGS

The above and other objects, features and advantages of the disclosure will become clearer through the following detailed description together with the accompanying drawings in which.

DETAILED DESCRIPTION

Figure 1:
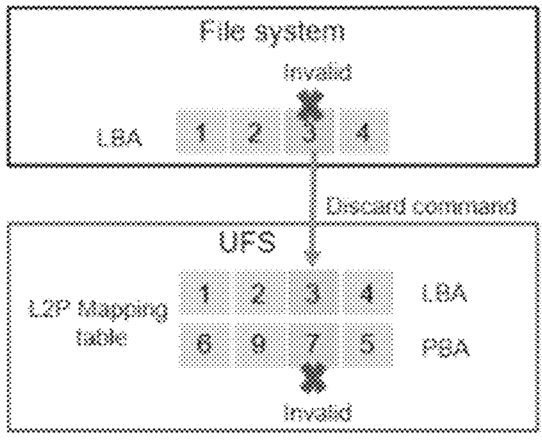
FIG. 1 illustrates an example of a discard command in the related art.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The following structural or functional descriptions of examples disclosed herein are merely intended for the purpose of describing the examples and the examples may be implemented in various forms. The examples are not meant to be limited, but it is intended that various modifications, equivalents, and alternatives are also covered within the scope of the claims.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the disclosure.

When a component is referred to as being "connected to" another component, the component can be directly connected or coupled to the other component or intervening components may be present.

As used herein, the singular forms "a", "an", and "the" are intended to include the plural forms as well, unless the context clearly indicates otherwise. It should be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

The phrase "at least one of," when used with a list of items, means that different combinations of one or more of the listed items may be used, and only one item in the list may be needed. For example, "at least one of A, B, and C" includes any of the following combinations: A, B, C, A and B, A and C, B and C, and A and B and C, and any variations thereof. As an additional example, the expression "at least one of a, b, or c" may indicate only a, only b, only c, both a and b, both a and c, both b and c, all of a, b, and c, or variations thereof. Similarly, the term "set" means one or more. Accordingly, the set of items may be a single item or a collection of two or more items.

Unless otherwise defined, all terms including technical or scientific terms used herein have the same meaning as commonly understood by one of normal skill in the art to which examples belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Hereinafter, examples will be described in detail with reference to the accompanying drawings. Regarding the reference numerals assigned to the elements in the drawings, it should be noted that the same elements will be designated by the same reference numerals, and redundant descriptions thereof will be omitted.

In order to better understand the disclosure, the discard commands, which lead to long response time of an application or an Application-Not-Response (ANR) issue, are discussed below.

FIG. 1 illustrates an example of a discard command in the related art.

When data in a certain Logical Block Address (LBA) space within a file system is invalid, the file system may dispatch a discard command to a storage device, for example, Universal Flash Storage (UFS). The UFS updates a logical to physical (L2P) address mapping table, and marks data at a corresponding physical address as invalid. When the UFS performs garbage collection on a certain physical block, if data in the page on the physical block is marked as invalid, it's unnecessary to move the data in the page. Obviously, the discard commands may reduce additional overhead due to garbage collection by the storage device.

Figure 2:
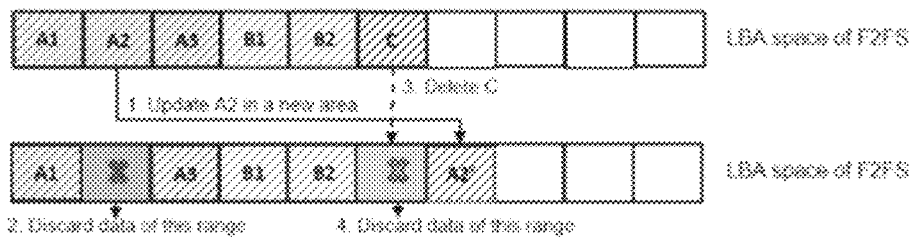
FIG. 2 illustrates that a Flash-Friendly File System (F2FS) file system generates discard commands in the related art.

As a log-type file system, Flash-Friendly File System (F2FS) updates data in an out-of-place update manner, so the F2FS may generate a large amount of discard commands. FIG. 2 illustrates that the F2FS generates discard commands in the related art.

Referring to FIG. 2, the LBA space of the F2FS includes areas A1 to A3, areas B1 to B2, and area C. When the F2FS updates data in the area A2', the F2FS may dispatch a discard command to the UFS, so that the data corresponding to the area A2 is marked as invalid. In addition, when the data located in area C is deleted, the F2FS may also dispatch the discard command to the UFS, so that the data corresponding to area C is marked as invalid.

The processing of discard commands may occupy input-output (IO) throughput of the system, thus may affect the response time of the foreground applications of the mobile device. Specifically, when the host continues to dispatch a large amount of discard commands to the storage device (for example, the UFS), the IO response time to the foreground application of the storage device will become longer, because the storage device is busy with processing the discard commands.

In addition, the usage status of storage devices may be also an important factor which leads a long response time of application or an ANR issue. For example, when a fill ratio of the UFS is too high or exceeds a predetermined threshold, it may be easy to trigger a garbage collection operation within the UFS, thus increasing the response time of the application.

Figure 3:
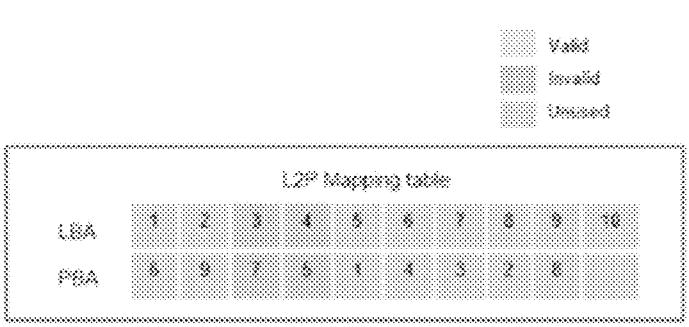
FIG. 3 illustrates an example of fill ratio of a Universal Flash Storage (UFS) in the related art.

The fill ratio of the UFS may represent a ratio of used space to a total space within the UFS. FIG. 3 illustrates an example in which the fill ratio of the UFS is 90%, in the related art.

The fill ratio, which exceeds a predetermined threshold (for example, 80%), indicates that a probability of triggering garbage collection operation within the UFS is higher. However, the above threshold is only an example, and the disclosure is not limited thereto.

In the related art, there are two modes of dispatching discard commands in the F2FS: a real-time mode and a lazy mode.

Figure 4:
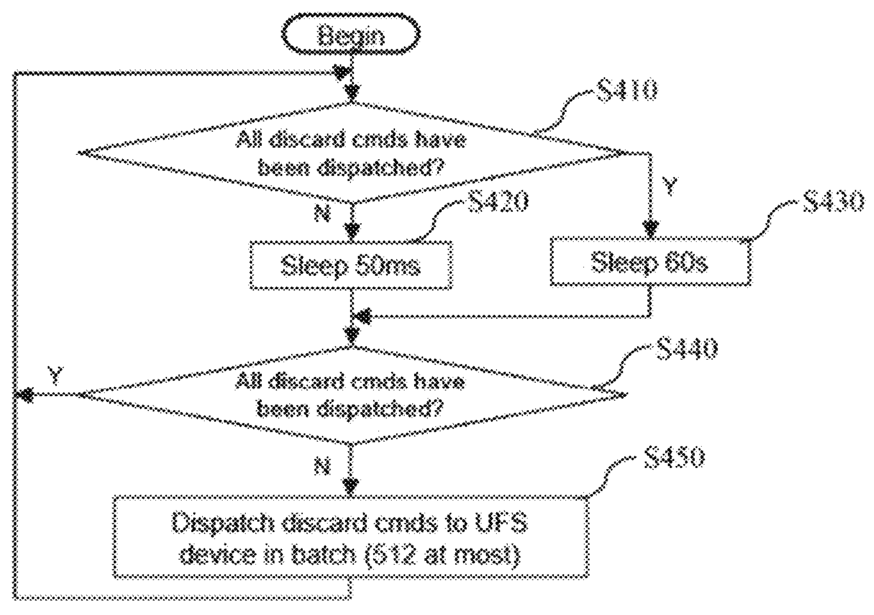
FIG. 4 is a flowchart of dispatching discard commands in a real-time mode in the related art.

FIG. 4 illustrates a flowchart of dispatching discard commands in the real-time mode, in the related art.

When idle segments in F2FS are insufficient, a garbage collection priority of F2FS becomes 'urgent_high.' At this time, a garbage collection operation is triggered to reclaim the valid logical address space. F2FS may dispatch the discard commands in the real-time mode.

Referring to FIG. 4, at operation S410, F2FS determines whether all discard commands have been dispatched firstly.

If NO, at operation S420, F2FS waits or sleeps for a predetermined time, and then at operation S440, F2FS determines whether all discard commands have been dispatched again. If NO, at operation S450, F2FS dispatches discard commands to the UFS in batch. The maximum number of discard commands dispatched in a batch is 512.

At operation S410, when it is determined that all discard commands have been dispatched, at operation S430, F2FS waits or sleeps for 60 s, and then performs operation S440.

Thus, in the real-time mode, F2FS may frequently dispatch the discard commands. Although the real-time mode may reduce the probability of ANR by processing discard commands in time, the response time of foreground application would become long, because the UFS is busy with processing discard commands.

F2FS may also dispatch the discard commands in the lazy mode. When there are enough idle segments in F2FS, the garbage collection priority of F2FS is urgent_middle or urgent_low. In order to reduce the influence on the foreground applications, the existing F2FS generally dispatches the discard commands only when the mobile phone is idle (for example, when the mobile phone is in charging, the screen is locked or the system time indicates the night mode).

However, in the lazy mode, it may cause the ANR issue, because the discard commands are not processed in time. In addition, if the mobile phone is determined as idle based on the system time or screen being locked, there may still be foreground applications running, and thus dispatching the discard commands at this time may affect the response time of the applications.

In other words, neither the real-time mode nor the lazy mode may take care of both reducing of response time of foreground applications and reducing of ANR occurrence. In addition, in both the real-time mode and the lazy mode, the granularity of dispatching discard commands is large (for example, 512 commands in a batch), which leads relatively long time required for the UFS to process discard commands.

Next, the method and system for reducing delay of application according to the disclosure will be described.

Figure 5:
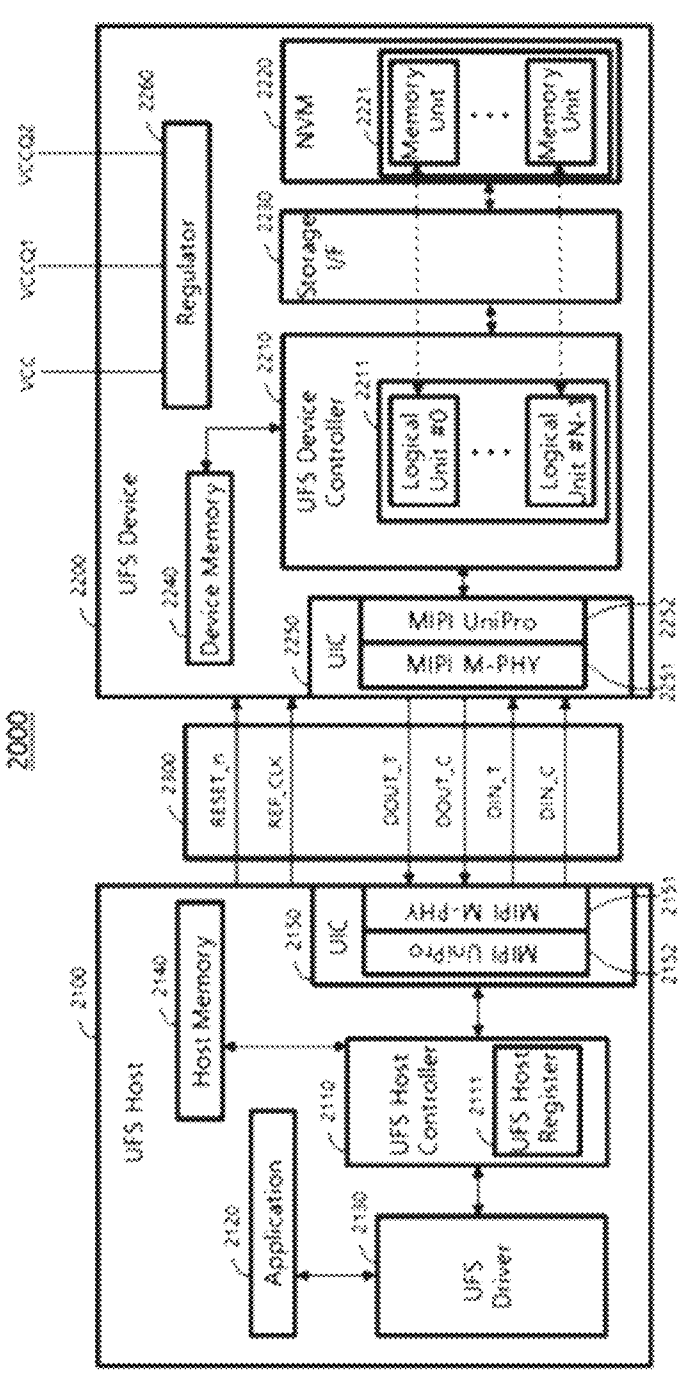
FIG. 5 illustrates a UFS system according to an example embodiment of the disclosure.

FIG. 5 illustrates the UFS system 2000 according to an example embodiment of the disclosure.

Referring to FIG. 5, the UFS system 2000 may be a system conforming to a UFS standard announced by Joint Electron Device Engineering Council (JEDEC) and include a UFS host 2100, a UFS device 2200, and a UFS interface 2300.

Referring to FIG. 5, the UFS host 2100 may be connected to the UFS device 2200 through the UFS interface 2300. When the main processor is an AP, the UFS host 2100 may be implemented as a portion of the AP.

The UFS host 2100 may include a UFS host controller 2110, an application 2120, a UFS driver 2130, a host memory 2140, and a UFS interconnect (UIC) layer 2150.

The UFS device 2200 may include the UFS device controller 2210, the NVM 2220, a storage interface 2230, a device memory 2240, a UIC layer 2250, and a regulator 2260. The NVM 2220 may include a plurality of memory units 2221. Although each of the memory units 2221 may include a V-NAND flash memory having a 2D structure or a 3D structure, each of the memory units 2221 may include another kind of NVM, such as PRAM and/or RRAM. The UFS device controller 2210 may be connected to the NVM 2220 through the storage interface 2230. The storage interface 2230 may be configured to comply with a standard protocol, such as Toggle or Open NAND Flash Interface (ONFI).

The application 2120 may refer to a program that wants to communicate with the UFS device 2200 to use functions of the UFS device 2200. The application 2120 may transmit input-output requests (IORs) to the UFS driver 2130 for input/output (I/O) operations on the UFS device 2200. The IORs may refer to a data read request, a data storage (or write) request, and/or a data erase (or discard) request, without being limited thereto.

The UFS driver 2130 may manage the UFS host controller 2110 through a UFS-host controller interface (the UFS-HCl). The UFS driver 2130 may convert the IOR generated by the application 2120 into a UFS command defined by the UFS standard and transmit the UFS command to the UFS host controller 2110. One IOR may be converted into a plurality of the UFS commands. Although the UFS command may basically be defined by an SCSI standard, the UFS command may be a command dedicated to the UFS standard.

The UFS host controller 2110 may transmit the UFS command converted by the UFS driver 2130 to the UIC layer 2250 of the UFS device 2200 through the UIC layer 2150 and the UFS interface 2300. During the transmission of the UFS command, a UFS host register 2111 of the UFS host controller 2110 may serve as a command queue (CQ).

The UIC layer 2150 on the side of the UFS host 2100 may include a mobile industry processor interface (MIPI) M-PHY 2151 and an MIPI UniPro 2152, and the UIC layer 2250 on the side of the UFS device 2200 may also include an MIPI M-PHY 2251 and an MIPI UniPro 2252.

The UFS interface 2300 may include a line configured to transmit a reference clock signal REF_CLK, a line configured to transmit a hardware reset signal RESET_n for the UFS device 2200, a pair of lines configured to transmit a pair of differential input signals DIN_t and DIN_c, and a pair of lines configured to transmit a pair of differential output signals DOUT_t and DOUT_c.

A frequency of a reference clock signal REF_CLK provided from the UFS host 2100 to the UFS device 2200 may be one of 19.2 MHz, 26 MHz, 38.4 MHz, and 52 MHz, without being limited thereto. The UFS host 2100 may change the frequency of the reference clock signal REF_CLK during an operation, that is, during data transmission/receiving operations between the UFS host 2100 and the UFS device 2200. The UFS device 2200 may generate cock signals having various frequencies from the reference clock signal REF_CLK provided from the UFS host 2100, by using a phase-locked loop (PLL). Also, the UFS host 2100 may set a data rate between the UFS host 2100 and the UFS device 2200 by using the frequency of the reference clock signal REF_CLK. That is, the data rate may be determined depending on the frequency of the reference clock signal REF_CLK.

The UFS interface 2300 may support a plurality of lanes, each of which may be implemented as a pair of differential lines. For example, the UFS interface 2300 may include at least one receiving lane and at least one transmission lane. In FIG. 5, a pair of lines configured to transmit a pair of differential input signals DIN_T and DIN_C may constitute a receiving lane, and a pair of lines configured to transmit a pair of differential output signals DOUT_T and DOUT_C may constitute a transmission lane. Although one transmission lane and one receiving lane are illustrated in FIG. 5, the number of transmission lanes and the number of receiving lanes may be changed.

The receiving lane and the transmission lane may transmit data based on a serial communication scheme. Full-duplex communications between the UFS host 2100 and the UFS device 2200 may be enabled due to a structure in which the receiving lane is separated from the transmission lane. That is, while receiving data from the UFS host 2100 through the receiving lane, the UFS device 2200 may transmit data to the UFS host 2100 through the transmission lane. In addition, control data (e.g., a command) from the UFS host 2100 to the UFS device 2200 and user data to be stored in or read from the NVM 2220 of the UFS device 2200 by the UFS host 2100 may be transmitted through the same lane. Accordingly, between the UFS host 2100 and the UFS device 2200, there may be no need to further provide a separate lane for data transmission in addition to a pair of receiving lanes and a pair of transmission lanes.

The UFS device controller 2210 of the UFS device 2200 may control all operations of the UFS device 2200. The UFS device controller 2210 may manage the NVM 2220 by using a logical unit (LU) 2211, which is a logical data storage unit. The number of LUs 2211 may be 8, without being limited thereto. The UFS device controller 2210 may include an FTL and convert a logical data address (e.g., a logical block address (LBA)) received from the UFS host 2100 into a physical data address (e.g., a physical block address (PBA)) by using address mapping information of the FTL. A logical block configured to store user data in the UFS system 2000 may have a size in a predetermined range. For example, a minimum size of the logical block may be set to 4 Kbyte.

When a command from the UFS host 2100 is applied through the UIC layer 2250 to the UFS device 2200, the UFS device controller 2210 may perform an operation in response to the command and transmit a completion response to the UFS host 2100 when the operation is completed.

As an example, when the UFS host 2100 intends to store user data in the UFS device 2200, the UFS host 2100 may transmit a data storage command to the UFS device 2200. When a response (a 'ready-to-transfer' response) indicating that the UFS host 2100 is ready to receive user data (ready-to-transfer) is received from the UFS device 2200, the UFS host 2100 may transmit user data to the UFS device 2200. The UFS device controller 2210 may temporarily store the received user data in the device memory 2240 and store the user data, which is temporarily stored in the device memory 2240, at a selected position of the NVM 2220 based on the address mapping information of the FTL.

As another example, when the UFS host 2100 intends to read the user data stored in the UFS device 2200, the UFS host 2100 may transmit a data read command to the UFS device 2200. The UFS device controller 2210, which has received the command, may read the user data from the NVM 2220 based on the data read command and temporarily store the read user data in the device memory 2240. During the read operation, the UFS device controller 2210 may detect and correct an error in the read user data by using an ECC engine embedded therein. More specifically, the ECC engine may generate parity bits for write data to be written to the NVM 2220, and the generated parity bits may be stored in the NVM 2220 along with the write data. During the reading of data from the NVM 2220, the ECC engine may correct an error in read data by using the parity bits read from the NVM 2220 along with the read data, and output error-corrected read data.

In addition, the UFS device controller 2210 may transmit user data, which is temporarily stored in the device memory 2240, to the UFS host 2100. In addition, the UFS device controller 2210 may further include an AES engine. The AES engine may perform at least of an encryption operation and a decryption operation on data transmitted to the UFS device controller 2210 by using a symmetric-key algorithm.

The UFS host 2100 may sequentially store commands, which are to be transmitted to the UFS device 2200, in the UFS host register 2111, which may serve as a common queue, and sequentially transmit the commands to the UFS device 2200. In this case, even while a previously transmitted command is still being processed by the UFS device 2200, that is, even before receiving a notification that the previously transmitted command has been processed by the UFS device 2200, the UFS host 2100 may transmit a next command, which is on standby in the CQ, to the UFS device 2200. Thus, the UFS device 2200 may also receive a next command from the UFS host 2100 during the processing of the previously transmitted command. A maximum number (or queue depth) of commands that may be stored in the CQ may be, for example, 32. Also, the CQ may be implemented as a circular queue in which a start and an end of a command line stored in a queue are indicated by a head pointer and a tail pointer.

Each of the plurality of memory units 2221 may include a memory cell array and a control circuit configured to control an operation of the memory cell array. The memory cell array may include a 2D memory cell array or a 3D memory cell array. The memory cell array may include a plurality of memory cells. Although each of the memory cells is a single-level cell (SLC) configured to store 1-bit information, each of the memory cells may be a cell configured to store information of 2 bits or more, such as a multi-level cell (MLC), a triple-level cell (TLC), and a quadruple-level cell (QLC). The 3D memory cell array may include a vertical NAND string in which at least one memory cell is vertically oriented and located on another memory cell.

Voltages VCC, VCCQ, and VCCQ2 may be applied as power supply voltages to the UFS device 2200. The voltage VCC may be a main power supply voltage for the UFS device 2200 and be in a range of 2.4 V to 3.6 V. The voltage VCCQ may be a power supply voltage for supplying a low voltage mainly to the UFS device controller 2210 and be in a range of 1.14 V to 1.26 V. The voltage VCCQ2 may be a power supply voltage for supplying a voltage, which is lower than the voltage VCC and higher than the voltage VCCQ, mainly to an I/O interface, such as the MIPI M-PHY 2251, and be in a range of 1.7 V to 1.95 V. The power supply voltages may be supplied through the regulator 2260 to respective components of the UFS device 2200. The regulator 2260 may be implemented as a set of unit regulators respectively connected to different ones of the power supply voltages described above.

Figure 6:
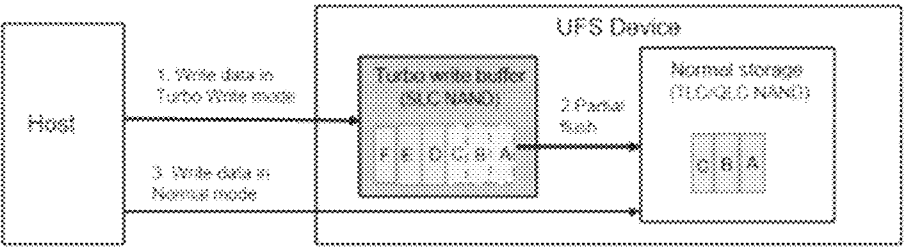
FIG. 6 illustrates another example of a UFS system according to an example embodiment of the disclosure.

FIG. 6 illustrates another example of a UFS system according to an example embodiment of the disclosure.

Referring to FIG. 6, the UFS device may use high-speed, high-cost Single-Level Cell (SLC) NAND as a Turbo write buffer to accelerate write performance thereof. In addition, the UFS devices may use low-speed and low-cost Triple-Level Cell/Quad-Level Cell (TLC/SLC) NAND as a normal storage area to improve the storage capacity of the UFS.

The UFS device may have Turbo write 2.0 characteristic. The Turbo write 2.0 characteristic may not only support the host to write data directly into the Turbo write buffer, but also support the direct write of data into the normal storage area. Referring to FIG. 6, in the Turbo write mode, the host may write data (for example, data A to F) into the Turbo write buffer. In the normal mode, the host may write data into a normal storage area composed of TLC/QLC NAND flash memory.

In addition, the Turbo write 2.0 characteristic may also support the partial flush function. When the partial flush function is enabled, if the data in the Turbo write buffer is full, the UFS device may flush a part of the data (for example, data A to C) in the Turbo write buffer to the normal storage area. The UFS device may flush data into the normal storage area in a first-in first-out (FIFO) manner.

According to the locality principle, the data recently written into the Turbo write buffer is likely to be accessed again. Therefore, the FIFO strategy may maintain the data recently written in the Turbo write buffer, thus improving the data access speed.

Figure 7:
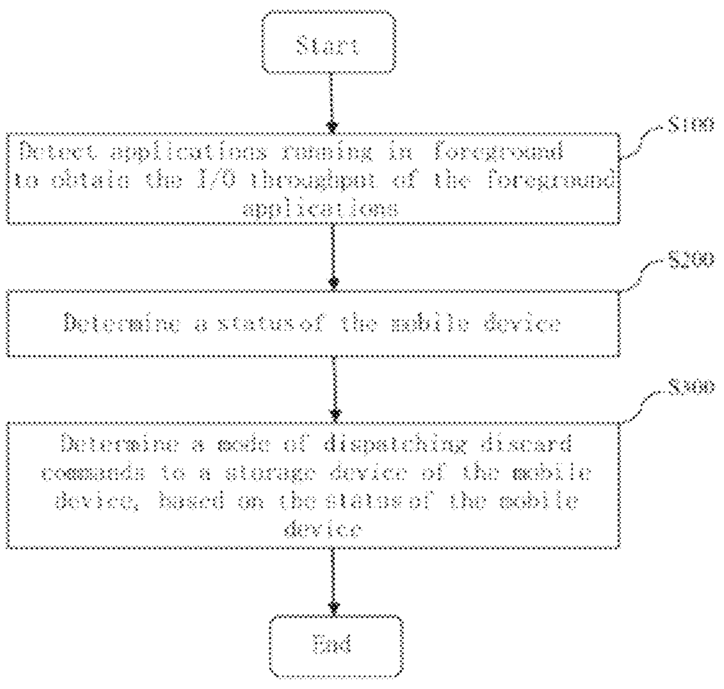
FIG. 7 illustrates a method for reducing delay of an application according to an example embodiment of the disclosure.

FIG. 7 illustrates a method for reducing delay of an application according to an example embodiment of the disclosure.

Referring to FIG. 7, at operation S100, applications running in foreground may be detected to obtain the input-output (IO) throughput of the foreground applications. For example, process lists of the foreground applications may be obtained, and the IO throughput of the foreground applications may be counted based on the process lists.

At operation S200, a status of the mobile device may be determined based on the IO throughput of the foreground applications. For example, the status of the mobile device may include an idle state and a busy state. The busy/idle state of the mobile device may be determined based on the comparison of the IO throughput of the foreground applications with a predetermined threshold.

At operation S300, a mode of dispatching discard commands to a storage device of the mobile device may be determined based on the status of the mobile device.

Figure 8:
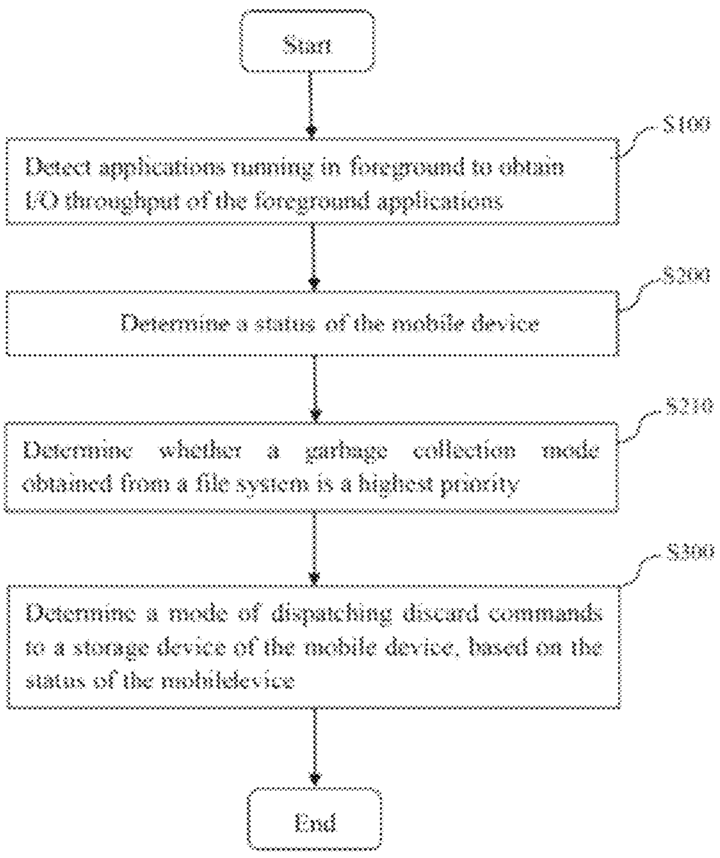
FIG. 8 illustrates a method for reducing delay of an application according to an example embodiment of the disclosure.

FIG. 8 illustrates a method for reducing delay of an application according to an example embodiment of the disclosure. Operations S100, S200 and S300 in FIG. 8 are the same as operations S100, S200 and S300 in FIG. 7, and repeated description will be omitted for conciseness.

Referring to FIG. 8, prior to operation S300, whether a garbage collection mode obtained from a file system has the highest priority may be determined at operation S210.

For example, the garbage collection mode may include 'urgent_high,' 'urgent_middle,' or 'urgent_low.' The garbage collection mode of the urgent_high indicates that the internal space of F2FS is insufficient, and a garbage collection operation needs to be triggered as soon as possible. Therefore, the garbage collection mode of the urgent_high may have the highest priority. The garbage collection mode of the urgent_middle indicates that F2FS needs garbage collection to reclaim the internal space, while the garbage collection mode of the urgent_low indicates that it is not necessary for F2FS to perform garbage collection. Therefore, the priority of garbage collection mode may be that the urgent_high is higher than the urgent_middle, and the urgent_middle is higher than the urgent_low.

The above description about the garbage collection mode is only an example, and the disclosure is not limited thereto. The priority of garbage collection mode may be set according to system or user requirements.

At operation S210, when it is determined that the garbage collection mode has the highest priority, discard commands may be dispatched to the storage device in coarse-granularity regardless of the busy/idle state of the mobile device. At operation S210, when it is determined that the garbage collection mode has not the highest priority, operation S300 may be performed.

Although FIG. 8 illustrates various operations, the order of the operations is not necessarily limited to those shown in FIG. 8. For example, operation S210 may be performed in parallel with operations S100 and/or S200.

Figure 9:
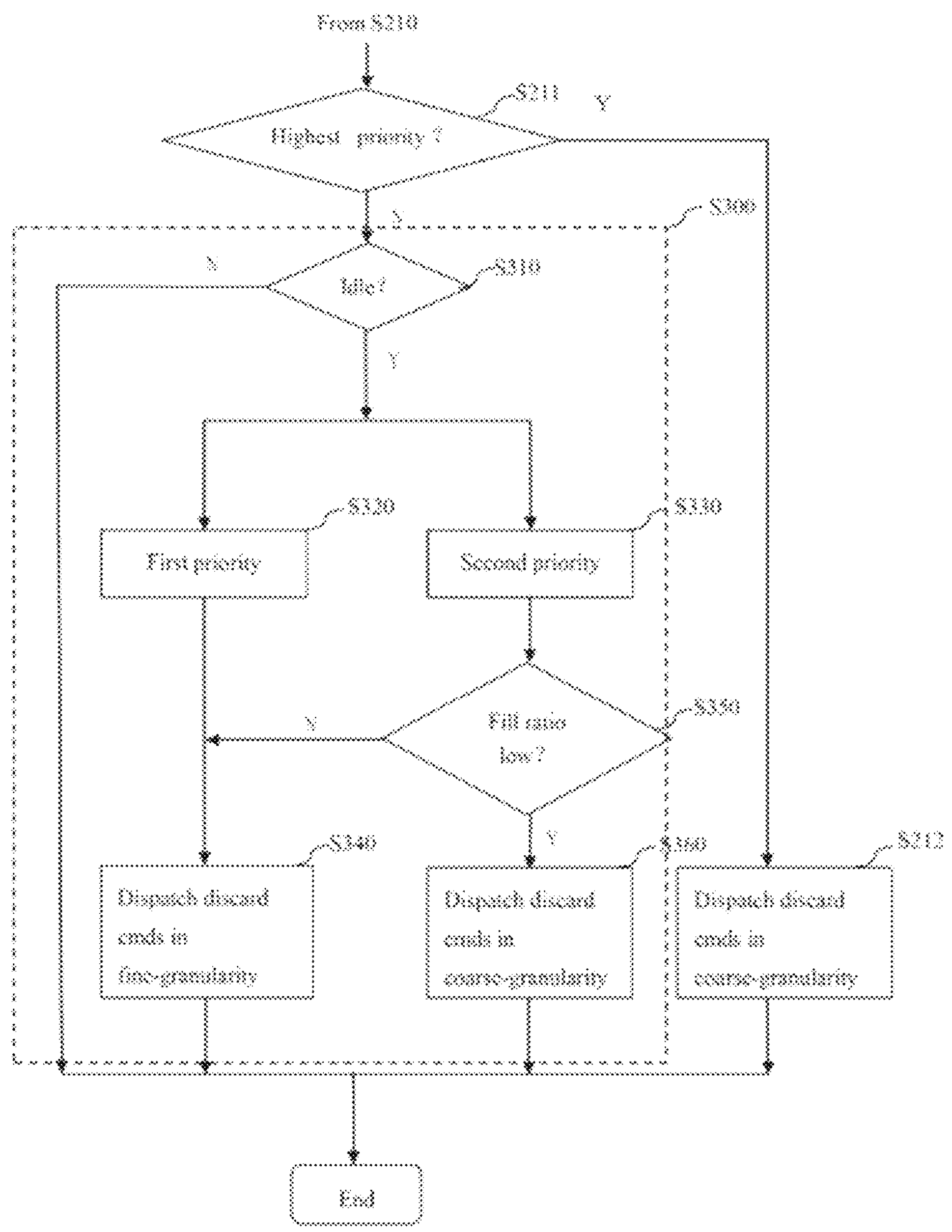
FIG. 9 is a flowchart of dispatching discard commands according to an example embodiment of the disclosure.

FIG. 9 illustrates dispatching discard commands according to an example embodiment of the disclosure. The operations in FIG. 9 may correspond to operations S210 and S300 in FIG. 8.

Referring to FIG. 9, at operation S211, when it is determined that the priority of the garbage collection mode is the highest priority (for example, the urgent_high), at operation S212, the discard commands may be dispatched to the storage device in coarse-granularity, regardless of the busy/idle state of the mobile device.

At operation S211, when it is determined that the priority of the garbage collection mode is not the highest priority, whether the mobile device is in the idle state may be determined at operation S310.

According to an example embodiment, whether the mobile device is in the idle state or busy state may be determined based on the IO throughput of the foreground applications of the mobile device. According to an example embodiment, the IO throughput of the foreground applications may be compared with a predetermined threshold. When the IO throughput of the foreground applications is greater than the predetermined threshold, the mobile device may be determined as in the busy state. When the IO throughput of the foreground applications is less than or equal to the predetermined threshold, the mobile device may be determined as in the idle state. However, the disclosure is not limited thereto, and other manners may be used to determine whether the mobile device is in the idle state or busy state.

In response to (or based on an identification that) the mobile device being in the busy state (i.e., NO in S310), no discard commands are dispatched to the storage device. When the IO throughput of the foreground applications of the mobile device is high, no discard commands are dispatched, thereby negative influence on the response time of the applications, which is caused by the processing of the discard commands by the UFS device, may be minimize.

In response to (or based on an identification that) the mobile device being in the idle state (i.e., YES in S310), branch S320 or S330 may be executed based on the result of determining priority of the garbage collection mode at operation S211. For example, at operation S211, when it is determined that the priority of the garbage collection mode is the first priority (e.g., the urgent-low) lower than the highest priority, the discard commands may be dispatched to the storage device in fine-granularity at operation S340. This is because when the garbage collection mode of F2FS is the urgent_low, it indicates that it is less necessary to perform garbage collection and/or dispatch the discard commands. At this time, dispatching discard commands in fine-granularity may not only reduce the occurrence of ANR issue by making the UFS process discard commands in advance, but also have little influence on the operation of foreground applications.

The number of discard commands dispatched in the fine-granularity mode may be smaller than that in the coarse-granularity mode. For example, in coarse-granularity mode, at most 512 discard commands may be dispatched at a time; and in the fine-granularity mode, at most 32 discard commands may be dispatched at a time. However, it is only an example, and the disclosure is not limited thereto. The number of discard commands dispatched in coarse-granularity mode and fine-granularity mode may be set differently as needed.

At operation S211, when it is determined that the priority of the garbage collection mode is the second priority (e.g., the urgent_middle) lower than the highest priority, at operation S350, the mode of dispatching the discard commands may be further determined based on the usage information of the storage device. For example, the mode of dispatching the discard commands may be determined based on the fill ratio of the UFS.

At operation S350, when it is determined that the fill ratio of the UFS is lower than a predetermined threshold, at operation S360, the discard commands may be dispatched to the UFS in coarse-granularity.

At operation S350, when it is determined that the fill ratio of the UFS is not lower than the predetermined threshold, it indicates that the probability of the UFS triggering garbage collection is high, and if the discard commands are dispatched in coarse-granularity, the response time of application may be too long. Therefore, operation S340 may be performed to dispatch the discard commands to the UFS in fine-granularity.

According to another example embodiment of the disclosure, operations S330, S350 and S360 may be omitted.

According to an example embodiment of the disclosure, the method for reducing delay of an application may determine the mode of dispatching the discard commands based on the priority of garbage collection mode, the status of the mobile device and the usage information of the storage device, thereby take care of both the reducing of response time of the application (especially the response time of the foreground application) and the reducing of ANR occurrence, and improves the performance of the mobile device and the user experience.

Figure 10:
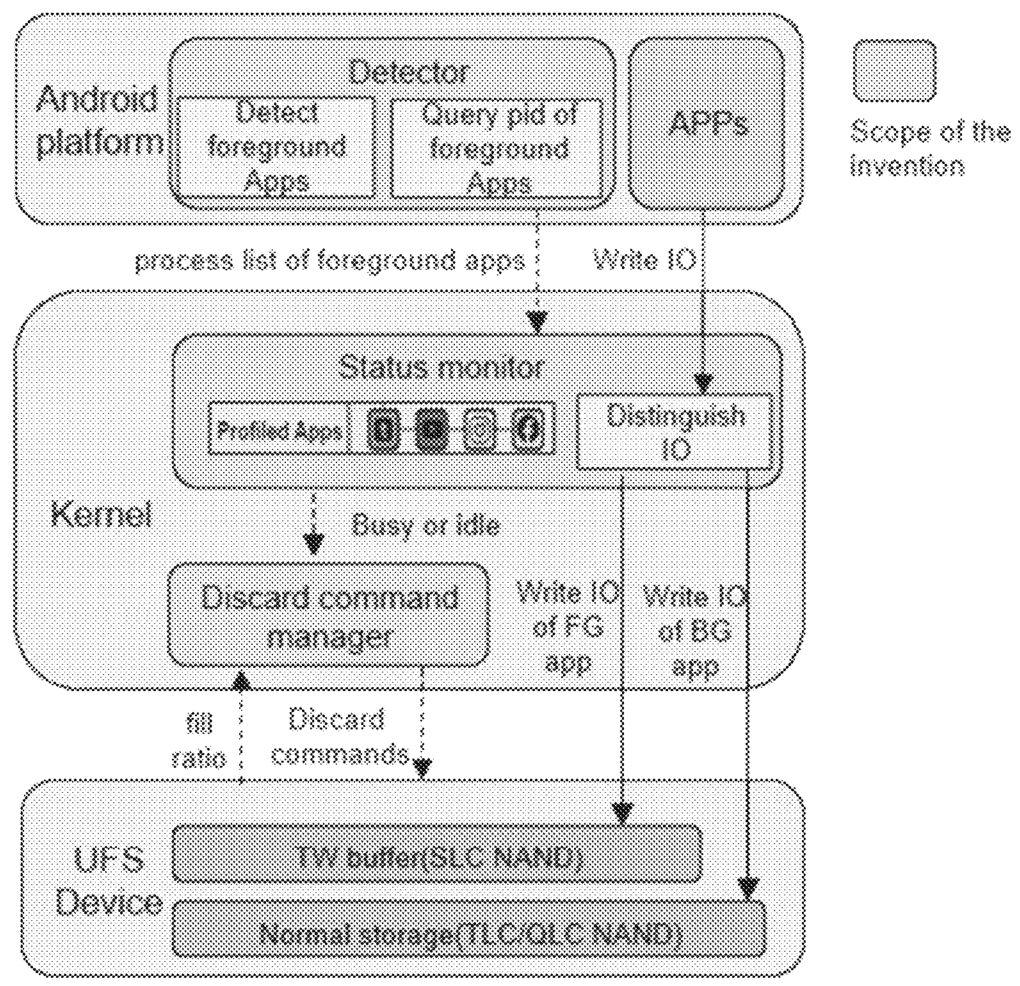
FIG. 10 illustrates a system for reducing delay of an application according to an example embodiment of the disclosure.

FIG. 10 illustrates a system for reducing delay of an application according to an example embodiment of the disclosure. The system for reducing delay of an application according to an example embodiment may be run in or correspond to a mobile device in a software manner.

Referring to FIG. 10, the system for reducing delay of an application may include a detector, a status monitor, and a discard command manager. In some embodiments, at least one processor of the mobile device may be configured to implement the detector, the status monitor, and the discard command manager.

The embodiments may be described and illustrated in terms of blocks, as shown in the drawings, which carry out a described function or functions. These blocks, which may be referred to herein as the detector, the status monitor, the discard command manager or the like may be physically implemented by analog and/or digital circuits including one or more of a logic gate, an integrated circuit, a microprocessor, a microcontroller, a memory circuit, a passive electronic component, an active electronic component, an optical component, and the like, and may also be implemented by or driven by software and/or firmware (configured to perform the functions or operations described herein). The circuits may, for example, be embodied in one or more semiconductor chips, or on substrate supports such as printed circuit boards and the like. Circuits included in a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks. Likewise, the blocks of the embodiments may be physically combined into more complex blocks.

The detector may detect the applications running in foreground, query the process lists of the foreground applications, and transmit the process lists to the status monitor.

For example, the detector may detect the following application events: the application being loaded to foreground, the background application being switched to foreground, the foreground application being killed or removed, and so on. Each application may be assigned a unique user identifier UID. The detector may query the process lists of foreground applications by the UID. The detector may transmit commands to add/remove the processes, to the status monitor through a proc file system.

The status monitor may receive the process lists of the foreground applications from the detector, and count the IO throughput of the foreground applications, so as to determine the status of the mobile device (for example, busy state or idle state). The status monitor may compare the IO throughput of the foreground applications with a predetermined threshold. When the IO throughput of the foreground application exceeds the predetermined threshold, the status of the mobile device may be determined as busy. When the IO throughput of the foreground applications does not exceed the predetermined threshold, the status of the mobile device may be determined as idle. The status monitor may periodically transmit the busy/idle state of the mobile device to the discard command manager.

The discard command manager may obtain the garbage collection mode from the file system, determine the priority of the garbage collection mode, and determine the mode of dispatching the discard commands to the storage device based on the determined priority.

In addition, the discard command manager may receive the busy/idle state of the mobile device from the status monitor, and periodically query the storage device for usage information of the storage device. For example, the discard command manager may obtain the fill ratio of the UFS from the UFS.

When the garbage collection mode of F2FS is the urgent_high, the discard command manager immediately dispatches the discard commands in coarse-granularity. In addition, the discard command manager dispatches the discard commands only when the mobile device is idle (that is, the IO throughput of the foreground applications is less than a predetermined threshold). Therefore, it can not only avoid the influence of dispatching discard commands on the foreground application IO, but also reduce the ANR issue due to massive accumulation of discard commands.

When the mobile device is in the idle state and the garbage collection mode of F2FS is the urgent_low, the discard command manager may dispatch the discard commands in fine-granularity.

When the mobile device is in the idle state and the garbage collection mode of F2FS is the urgent_middle, the discard command manager further determines the mode of dispatching discard commands based on the fill ratio of the UFS. For example, when the fill ratio of the UFS is lower than a predetermined threshold, the discard command manager may dispatch the discard commands in coarse-granularity. For example, when the fill ratio of the UFS is not lower than the predetermined threshold, the discard command manager may dispatch the discard commands in fine-granularity.

Figure 11:
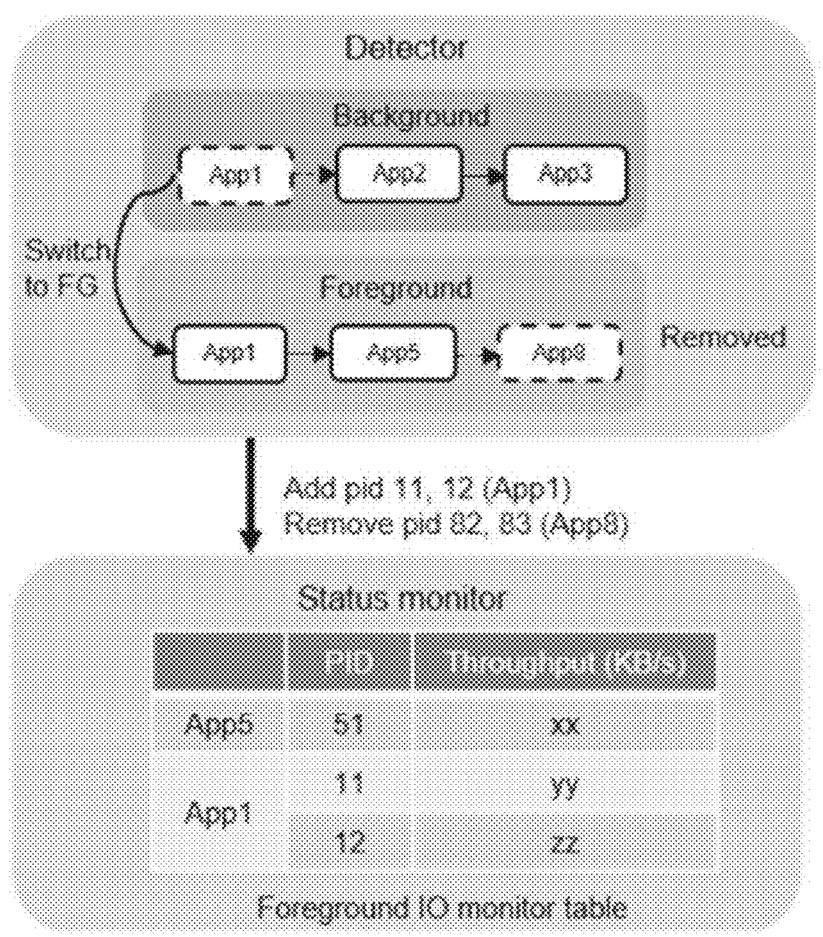
FIG. 11 illustrates operations of a detector and a status monitor according to an example embodiment of the disclosure.

FIG. 11 illustrates operations of a detector and a status monitor according to an example embodiment of the disclosure.

Referring to FIG. 11, the application App1 is switched from background to foreground, and the application App8 is removed from foreground. The detector may query the processes included in the applications App1 and App8. In FIG. 11, application App1 includes processes 11 and 12 (process IDs (PID) are 11 and 12), and the IO throughput of the processes 11 and 12 are yy and zz, respectively; the application App5 includes a process 51, and the IO throughput of the process 51 is xx; and the application App8 includes processes 82 and 83. The detector may transmit, to the status monitor, commands to add the processes (11, 12) of the application App1 and remove the processes (82, 83) of the application App8, respectively.

The status monitor may maintain the foreground IO monitor table. The information included in the foreground IO monitor table may include: name of the current foreground application, the process PID included in the foreground application, and the IO throughput of the process. After receiving, from the detector, the command to add or remove the processes, the status monitor may add related processes to the foreground IO monitor table, or remove the related processes from the foreground IO monitor table. As shown in FIG. 10, only the applications App1 and App5 are running in foreground currently. The status monitor may monitor the IO throughput of three processes (i.e., processes 11, 12 and 51) included in the applications App1 and App5.

When the IO throughput (e.g., sum of the IO throughput) of the foreground applications exceeds a predetermined threshold, the mobile device may be determined to be in the busy state. When the IO throughput of the foreground applications does not exceed a predetermined threshold, the mobile device may be determined to be in the idle state. The status monitor may periodically (for example, every 60 s) transmit the busy/idle state of the mobile device to the discard command manager.

Referring back to FIG. 10, the status monitor may also distinguish a write request of a foreground application from that of a background application, according to the process list of the foreground application. The status monitor may dispatch the write request of the foreground application to the Turbo write buffer of the UFS, and dispatch other write requests (for example, the write request of the background application) to the normal storage area of the UFS. Therefore, the access speed of the foreground applications may be improved and the response time of the foreground applications may be reduced through the Turbo write buffer with high speed and low delay.

Figure 12:
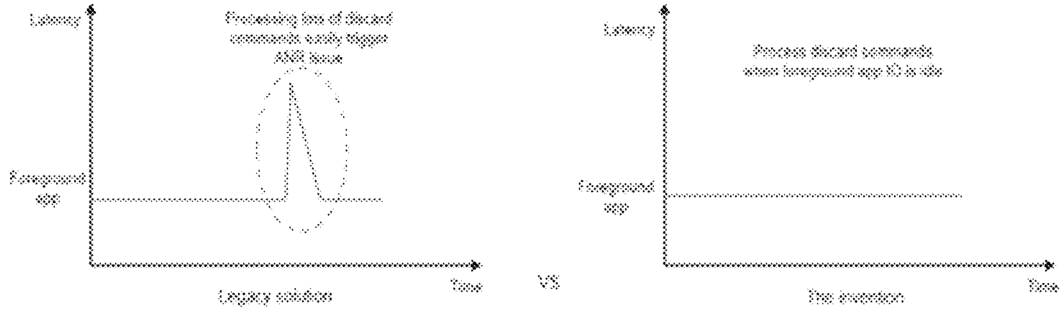
FIG. 12 illustrates response time of a foreground application.

FIG. 12 illustrates the response time of foreground application.

The left side of FIG. 12 shows an example of foreground application delay in the existing delay control scheme, and the right side of FIG. 11 shows an example of foreground application delay in the scheme for reducing the delay according to the example embodiment of the disclosure.

In the existing delay control scheme, the UFS needs to process lots of discard commands, which may lead to long response time of the application and occurrence of the ANR issue.

According to an example embodiment of the disclosure, in the method for reducing delay of an application, the discard commands may be dispatched when the IO of the foreground application is idle (i.e., the IO throughput of the foreground applications is lower than the predetermined threshold), thereby the long-tail response delay of the foreground application due to the massive processing of lots of discard commands, may be avoided by processing the discard commands in advance. In addition, dispatching a large amount of discard commands when garbage collection operations of the UFS are easily triggered may be avoided by determining the granularity of dispatching discard commands according to the priority of garbage collection mode and the usage ratio of storage device, thus improving the user experience by take care of both the reducing of ANR and the reducing of the response time of application.

Figure 13:
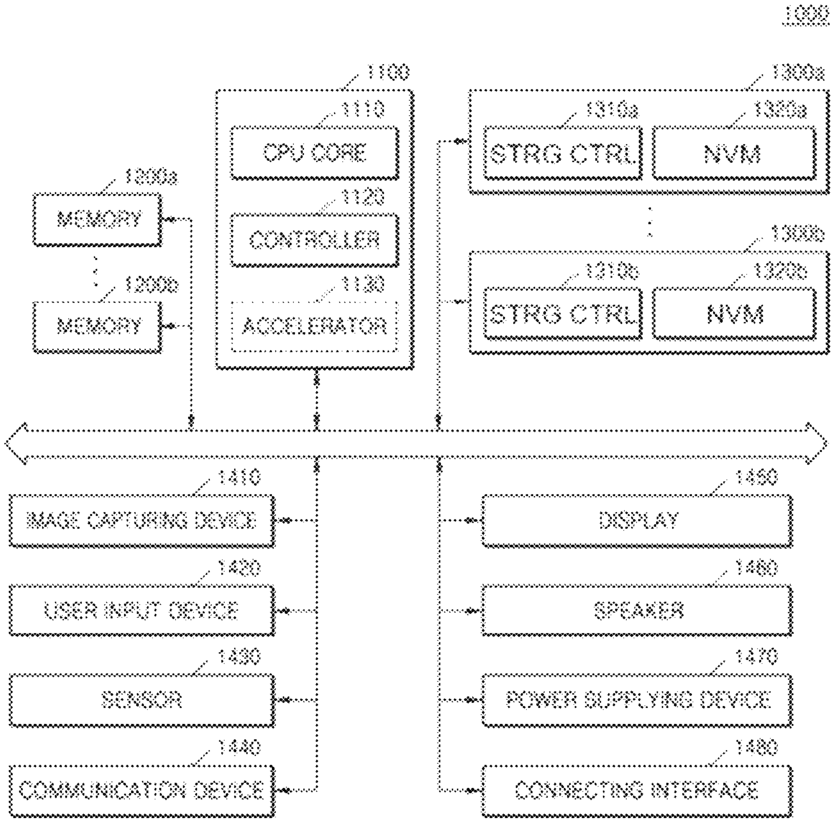
FIG. 13 illustrates a mobile device according to an example embodiment of the disclosure.

FIG. 13 illustrates a system 1000 to which a storage device is applied, according to an embodiment.

The system 1000 of FIG. 13 may basically be a mobile system, such as a portable communication terminal (e.g., a mobile phone), a smartphone, a tablet personal computer (PC), a wearable device, a healthcare device, or an Internet of things (IOT) device. However, the system 1000 of FIG. 13 is not necessarily limited to the mobile system and may be a PC, a laptop computer, a server, a media player, or an automotive device (e.g., a navigation device).

Referring to FIG. 13, the system 1000 may include a main processor 1100, memories (e.g., 1200*a* and 1200*b*), and storage devices (e.g., 1300*a* and 1300*b*). In addition, the system 1000 may include at least one of an image capturing device 1410, a user input device 1420, a sensor 1430, a communication device 1440, a display 1450, a speaker 1460, a power supplying device 1470, and a connecting interface 1480.

The main processor 1100 may control all operations of the system 1000, more specifically, operations of other components included in the system 1000. The main processor 1100 may be implemented as a general-purpose processor, a dedicated processor, or an application processor.

The main processor 1100 may correspond to at least one processor. The main processor 1100 may include at least one CPU core 1110 and further include a controller 1120 configured to control the memories 1200*a* and 1200*b* and/or the storage devices 1300*a* and 1300*b*. In some embodiments, the main processor 1100 may further include an accelerator 1130, which is a dedicated circuit for a high-speed data operation, such as an artificial intelligence (AI) data operation. The accelerator 1130 may include a graphics processing unit (GPU), a neural processing unit (NPU) and/or a data processing unit (DPU) and be implemented as a chip that is physically separate from the other components of the main processor 1100.

The memories 1200*a* and 1200*b* may be used as main memory devices of the system 1000. Although each of the memories 1200*a* and 1200*b* may include a volatile memory, such as static random access memory (SRAM) and/or dynamic RAM (DRAM), each of the memories 1200*a* and 1200*b* may include non-volatile memory, such as a flash memory, phase-change RAM (PRAM) and/or resistive RAM (RRAM). The memories 1200*a* and 1200*b* may be implemented in the same package as the main processor 1100.

The storage devices 1300*a* and 1300*b* may serve as non-volatile storage devices configured to store data regardless of whether power is supplied thereto, and have larger storage capacity than the memories 1200*a* and 1200*b*. The storage devices 1300*a* and 1300*b* may respectively include storage controllers (STRG CTRL) 1310*a* and 1310*b* and NVMs (Non-Volatile Memories) 1320*a* and 1320*b* configured to store data via the control of the storage controllers 1310*a* and 1310*b*. Although the NVMs 1320*a* and 1320*b* may include flash memories having a two-dimensional (2D) structure or a three-dimensional (3D) V-NAND structure, the NVMs 1320*a* and 1320*b* may include other types of NVMs, such as PRAM and/or RRAM.

The storage devices 1300*a* and 1300*b* may be physically separated from the main processor 1100 and included in the system 1000 or implemented in the same package as the main processor 1100. In addition, the storage devices 1300*a* and 1300*b* may have types of solid-state devices (SSDs) or memory cards and be removably combined with other components of the system 100 through an interface, such as the connecting interface 1480 that will be described below. The storage devices 1300*a* and 1300*b* may be devices to which a standard protocol, such as a universal flash storage (the UFS), an embedded multi-media card (eMMC), or a non-volatile memory express (NVMe), is applied, without being limited thereto.

The image capturing device 1410 may capture still images or moving images. The image capturing device 1410 may include a camera, a camcorder, and/or a webcam.

The user input device 1420 may receive various types of data input by a user of the system 1000 and include a touch pad, a keypad, a keyboard, a mouse, and/or a microphone.

The sensor 1430 may detect various types of physical quantities, which may be obtained from the outside of the system 1000, and convert the detected physical quantities into electric signals. The sensor 1430 may include a temperature sensor, a pressure sensor, an illuminance sensor, a position sensor, an acceleration sensor, a biosensor, and/or a gyroscope sensor.

The communication device 1440 may transmit and receive signals between other devices outside the system 1000 according to various communication protocols. The communication device 1440 may include an antenna, a transceiver, and/or a modem.

The display 1450 and the speaker 1460 may serve as output devices configured to respectively output visual information and auditory information to the user of the system 1000.

The power supplying device 1470 may appropriately convert power supplied from a battery embedded in the system 1000 and/or an external power source, and supply the converted power to each of components of the system 1000.

The connecting interface 1480 may provide connection between the system 1000 and an external device, which is connected to the system 1000 and capable of transmitting and receiving data to and from the system 1000. The connecting interface 1480 may be implemented by using various interface schemes, such as advanced technology attachment (ATA), serial ATA (SATA), external SATA (e-SATA), small computer small interface (SCSI), serial attached SCSI (SAS), peripheral component interconnection (PCI), PCI express (PCIe), NVMe, IEEE 1394, a universal serial bus (USB) interface, a secure digital (SD) card interface, a multi-media card (MMC) interface, an eMMC interface, a UFS interface, an embedded UFS (eUFS) interface, and a compact flash (CF) card interface.

The apparatuses, units, modules, devices, and other components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions and/or software include machine code that is directly executed by the processor or computer, such as machine code produced by a compiler. In another example, the instructions or software include higher-level code that is executed by the processor or computer using an interpreter. Persons and/or programmers of normal skill in the art may readily write the instructions and/or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include at least one of read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card or a micro card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions.

While various example embodiments have been described, it will be apparent to one of normal skill in the art that various changes in form and details may be made in these examples without departing from the spirit and scope of the claims and their equivalents.

What is claimed is:

1. A method for reducing delay of an application of a mobile device, the method comprising:

detecting at least one foreground application running in a foreground of an operation system of the mobile device and obtaining input/output (I/O) throughput of the at least one foreground application;

determining a status of the mobile device, based on the I/O throughput of the at least one foreground application; and determining a mode of dispatching discard commands to a storage device of the mobile device, based on the determined status of the mobile device.

2. The method of claim 1, wherein the status of the mobile device comprises an idle state and a busy state.

3. The method of claim 1, further comprising determining whether a garbage collection mode obtained from a file system has a highest priority, wherein the discard commands are dispatched to the storage device in coarse-granularity, based on the garbage collection mode having the highest priority, and wherein the determining the mode of dispatching discard commands to the storage device of the mobile device, based on the determined status of the mobile device, comprises determining the mode of dispatching discard commands to the storage device of the mobile device, based on the determined status of the mobile device and based on the garbage collection mode not having the highest priority.

4. The method of claim 3, wherein the determining the mode of dispatching discard commands to the storage device of the mobile device comprises:

dispatching no discard commands to the storage device in response to the mobile device being in a busy state; and dispatching discard commands to the storage device in fine-granularity, based on the mobile device being in an idle state and the determined priority having a first priority lower than the highest priority.

5. The method of claim 4, wherein the mode of dispatching the discard commands to the storage device is determined based on usage information of the storage device, based on the mobile device being in the idle state and the determined priority having a second priority lower than the highest priority, and wherein the second priority is higher than the first priority.

6. The method of claim 5, wherein the usage information of the storage device comprises a fill ratio of the storage device, wherein the discard commands are dispatched to the storage device in coarse-granularity, in response to the fill ratio of the storage device being lower than a first threshold, and wherein the discard commands are dispatched to the storage device in fine-granularity, in response to the fill ratio of the storage device being greater than or equal to the first threshold.

7. The method of claim 2, wherein the determining the status of the mobile device comprises:

comparing the I/O throughput of the at least one foreground application with a second threshold;

determining that the mobile device is in the busy state in response to the I/O throughput of the at least one foreground application being greater than the second threshold; and determining that the mobile device is in the idle state in response to the I/O throughput of the at least one foreground application being less than or equal to the second threshold.

8. The method of claim 1, wherein the storage device comprises a first storage area and a second storage area, and wherein the first storage area comprises a Turbo write buffer comprising single level cells, and the second storage area comprises a memory comprising multi-level cells.

9. The method of claim 8, further comprising:

writing data of the at least one foreground application into the Turbo write buffer of the first storage area, and writing data of background applications into the second storage area.

10. The method of claim 9, further comprising flushing data from the first storage area to the second storage area in a first-in first-out manner, in response to the Turbo write buffer of the first storage area being full.

11. The method of claim 3, wherein the file system is a Flash-Friendly File System (F2FS), and wherein the storage device is a Universal Flash Storage (UFS).

12. A mobile device comprising at least one processor configured to implement:

a detector configured to detect at least one foreground application running in a foreground of an operation system of the mobile device and to obtain a process list of the at least one foreground application;

a status monitor configured to obtain input/output (I/O) throughput of the at least one foreground application based on the process list of the at least one foreground application, and determine a status of the mobile device based on the I/O throughput of the at least one foreground application; and a discard command manager configured to determine a mode of dispatching discard commands to a storage device of the mobile device, based on the determined status of the mobile device.

13. The mobile device of claim 12, wherein the status of the mobile device comprises an idle state and a busy state.

14. The mobile device of claim 13, wherein the discard command manager is further configured to determine whether a garbage collection mode obtained from a file system has a highest priority, wherein the discard commands are dispatched to the storage device in coarse-granularity, based on the garbage collection mode having the highest priority, and wherein the discard command manager is further configured to determine the mode of dispatching discard commands to the storage device of the mobile device, based on the determined status of the mobile device and based on the garbage collection mode not having the highest priority.

15. The mobile device of claim 14, wherein the discard command manager is further configured to:

dispatch no discard commands to the storage device, based on the mobile device being in the busy state; and dispatch discard commands to the storage device in fine-granularity, based on the mobile device being in the idle state and the determined priority having a first priority lower than the highest priority.

16. The mobile device of claim 15, wherein the discard command manager is further configured to determine the mode of dispatching the discard commands to the storage device based on usage information of the storage device, based on the mobile device being in the idle state and the determined priority having a second priority lower than the highest priority, and wherein the second priority is higher than the first priority.

17. The mobile device of claim 16, wherein the usage information of the storage device comprises a fill ratio of the storage device, and wherein the discard command manager is further configured to:

dispatch the discard commands to the storage device in coarse-granularity in response to the fill ratio of the storage device being lower than a first threshold, and dispatch the discard commands to the storage device in fine-granularity in response to the fill ratio of the storage device being higher than or equal to the first threshold.

18. The mobile device of claim 13, wherein the status monitor is further configured to:

compare the I/O throughput of the at least one foreground application with a second threshold;

determine that the mobile device is in the busy state in response to the I/O throughput of the at least one foreground application being greater than the second threshold; and determine that the mobile device is in the idle state in response to the I/O throughput of the at least one foreground application being less than or equal to the second threshold.

19. The mobile device of claim 18, wherein the status monitor is further configured to write data of the at least one foreground application into a Turbo write buffer of a first storage area within the storage device, and write data of background applications into a second storage area within the storage device, and wherein the first storage area comprises the Turbo write buffer comprising single level cells, and the second storage area comprises a memory composed of multi-level cells.

20. An electronic device comprising:

at least one processor; and a storage device comprising one or more memories configured to store instructions which, when executed by the at least one processor, cause the at least one processor to:

detect at least one foreground application running in a foreground of an operation system of the electronic device and obtain input/output (I/O) throughput of the at least one foreground application;

determine a status of the electronic device, based on the I/O throughput of the at least one foreground application; and determine a mode of dispatching discard commands to the storage device, based on the determined status of the electronic device.

* * * * *